Nov. 24, 1964 C. F. KOHLER 3,158,429

SYSTEM FOR RECORDING REGISTERED DATA

Original Filed Sept. 19, 1958 5 Sheets-Sheet 1

INVENTOR.
Charles F. Kohler
BY
Harness, Dickey & Pierce
ATTORNEYS.

SYSTEM FOR RECORDING REGISTERED DATA

Original Filed Sept. 19, 1958 5 Sheets-Sheet 2

INVENTOR.
Charles F. Kohler
BY
Hanson, Dickey & Pierce
ATTORNEYS

SYSTEM FOR RECORDING REGISTERED DATA

Original Filed Sept. 19, 1958 5 Sheets-Sheet 3

INVENTOR.
Charles F. Kohler
BY
Hansen, Dickey & Pierce
ATTORNEYS

Nov. 24, 1964 C. F. KOHLER 3,158,429

SYSTEM FOR RECORDING REGISTERED DATA

Original Filed Sept. 19, 1958 5 Sheets-Sheet 4

INVENTOR.

Charles F. Kohler

BY

Hamess, Dickey & Pierce

ATTORNEYS.

SYSTEM FOR RECORDING REGISTERED DATA
Original Filed Sept. 19, 1958 5 Sheets-Sheet 5
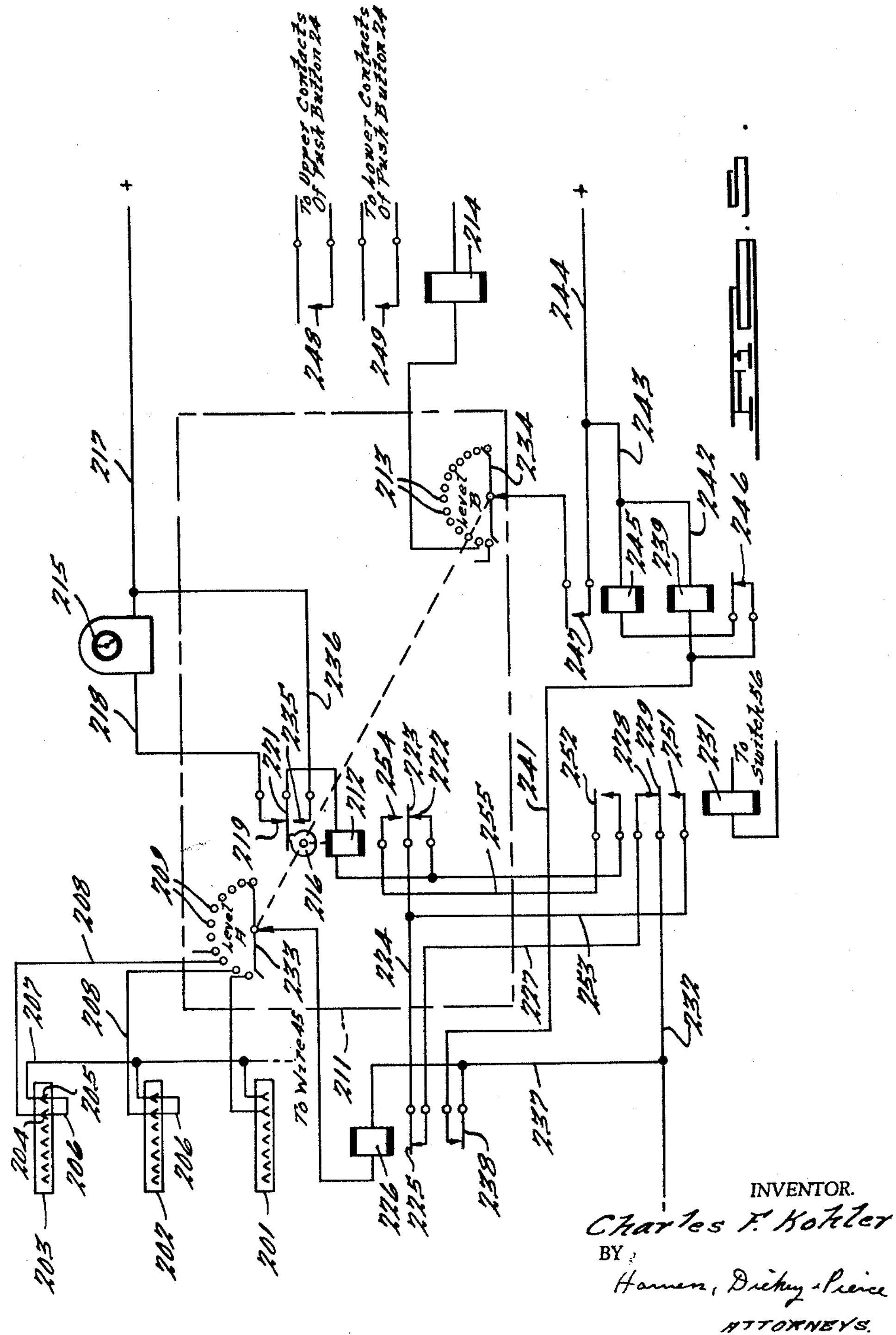
INVENTOR.
Charles F. Kohler
BY Hamness, Dickey & Pierce
ATTORNEYS.

United States Patent Office 3,158,429

Patented Nov. 24, 1964

3,158,429

SYSTEM FOR RECORDING REGISTERED DATA

Charles F. Kohler, Parma, Mich., assignor, by mesne assignments, to Hancock Telecontrol Corporation, Jackson, Mich., a corporation of Ohio Original application Sept. 19, 1958, Ser. No. 762,165, now Patent No. 3,099,512, dated July 30, 1963. Divided and this application Dec. 10, 1962, Ser. No. 248,828
1 Claim. (Cl. 346—52)

This invention relates to systems for recording registered data, and more particularly to an arrangement by means of which precoded data as well as information collected on registers may be transferred in a rapid and orderly fashion to permanent records. This application is a division of copending application Serial No. 762,165, filed September 19, 1958, now Patent No. 3,099,512.

It is an object of the invention to provide a novel and improved recording system which will gather information from precoded or registered sources for recording purposes, while at the same time resetting the registers so that they may be used for another cycle.

It is another object to provide an improved recording system of this nature which includes means for feeding the precoded and registered data into intermediate storage means while the registers are being reset and includes scanning means responsive to resetting of the registers for sequentially transferring information from successive storage units into a recording device.

It is a further object to provide an improved recording system of the above character which may be used to record information from a plurality of indicator sets each of which contains a number of precoded information carriers and registers for data such as would be collected in a production control system for machine tools in an industrial establishment.

It is a further object to provide an improved recording system of this nature which may be used in conjunction with standard types of recording units and in which the power supply to such recording units will be isolated from the system power supply, thus avoiding short circuits or malfunctioning of the mechanism.

Other objects, features and advantages of the present invention will become apparent from the following detailed description taken in conjunction with the accompanying drawings, in which:

FIGURE 5 is an electrical circuit diagram of an arrangement for automatically scanning a group of indicator sets at periodic intervals.

Figure 1:
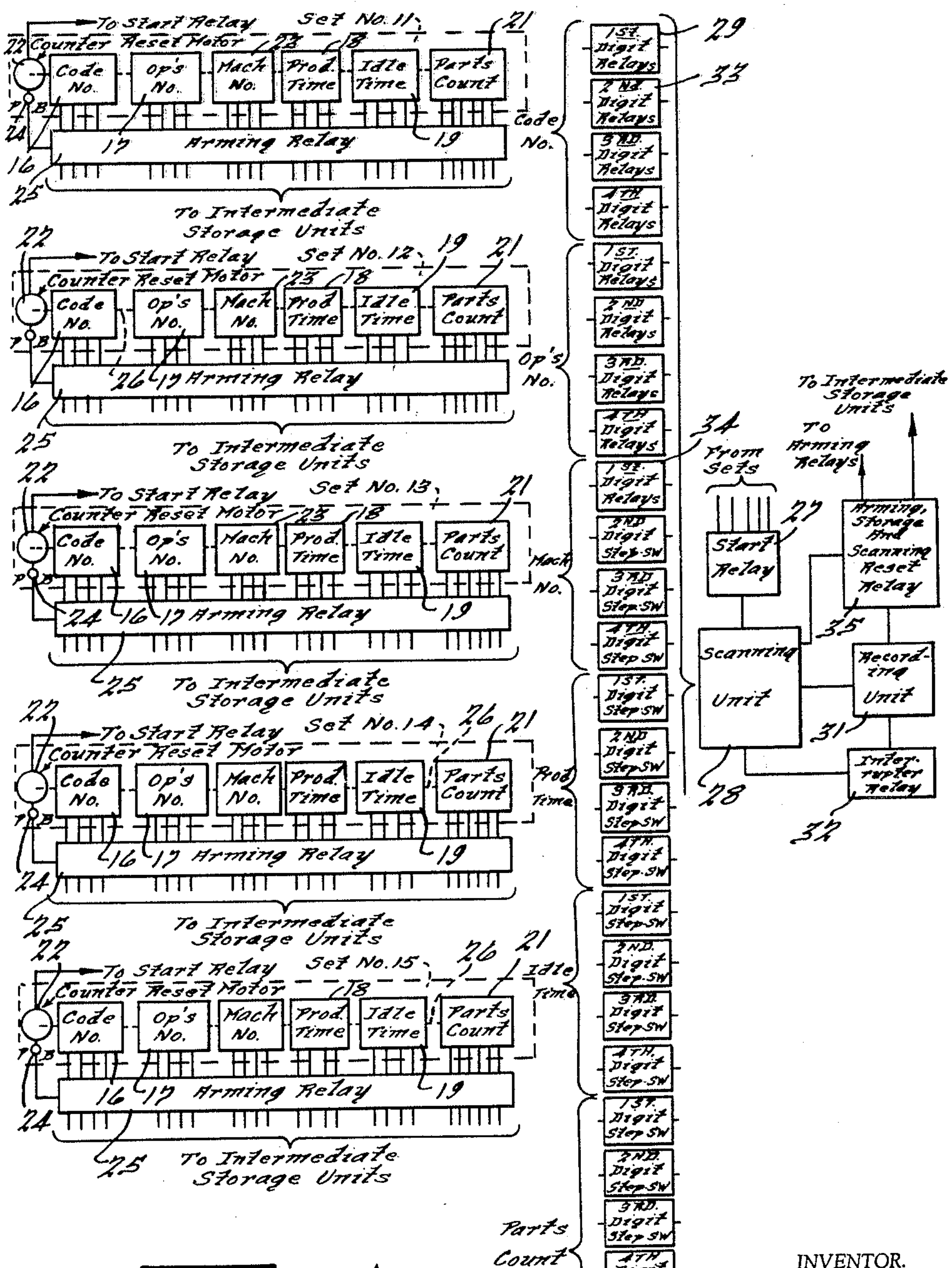
FIGURE 1 is a diagrammatic view of the improved system of this invention applied to a plurality of indicator sets in a production control system for a factory.

In general terms, the illustrated embodiment of the improved recording system is adapted to collect and record information in a production control system for a plurality of machine tools in an industrial plant, it being understood that the principles of the invention could be applied to the recording of other types of data. A production control system of the type referred to is disclosed in copending application Serial No. 586,788, filed May 23, 1956, by Charles F. Kohler and Belding H. McCurdy and assigned to the assignee of the present application. As shown in the above-mentioned application, the production control system includes a plurality of indicator sets located at a central station, each indicator set being associated with an individual machine tool in the plant. In addition to visual signals not pertinent to the present invention, each indicator set has a register for indicating the productive time of an operator assigned to the machine, a register for idle or unproductive time, and a parts register which counts the parts produced. Also associated with each indicator set is a preselected code number which may refer to the part being produced by the machine, a clock number for identifying the machine operator assigned to the machine, and a machine number which will remain the same for each machine.

Under normal circumstances, after a production run on a machine has been completed by an operator, or if an operator is removed from the machine before completion of a production run, the information collected on the above-mentioned registers must be recorded for pay, inventory control and other accounting purposes. The code number, operator's number and machine number must also be recorded alongside the information gathered from the registers, and the latter must then be reset to the zero position in readiness for future use. The disadvantages of carrying out these steps manually will be obvious. Besides the possibilities of human errors in transcription, the time consumed in manually recording information from a large number of indicator sets can cause considerable difficulty, especially if this must be done between shifts in the plant.

According to the invention, a plurality of intermediate storage units are provided, one such unit being available for each digit to the recorded. If each indicator set, for example, has twenty-six digits of precoded and registered data which must be recorded, twenty-six intermediate storage units will be provided. These storage units are connected successively to the indicator sets by means such as push buttons associated with the individual sets, or by an automatic scanning device which selects only those indicator sets having information to be recorded. As the storage units are connected to each set, the registers in that set will be reset to zero. At the same time, information from the precoded portions of the set, which may be in the form of printed circuits, and the information from the registers being reset, will be transferred to the storage units.

A storage scanning unit is also provided, and as resetting of the registers is completed, this scanning unit is caused successively to scan the individual storage units, transferring the information from these units to a recording unit. The recording unit may be of a conventional nature, and as illustrated, is a punch card machine of the type produced by the Remington Rand Corporation. With this equipment, a set of six punch card solenoids are actuated in various combinations to produce any single digit from zero to nine. Since each storage unit has information pertaining to a single digit, connection of the punch card solenoids to successive storage units will result in all the digits being recorded on a single card.

After the card has been completely punched, the punch card carriage will cause resetting of the intermediate storage units as well as the scanning unit. The operator or indicator set scanner may then cause another indicator set to be connected to the recording system for repetition of this cycle.

Referring more particularly to the drawings, FIGURE 1 shows in diagrammatic fashion the application of the improved recording system to a production control system having a plurality of indicator sets at a central station. Five such indicator sets, 11, 12, 13, 14 and 15 are shown in the drawing, each of these sets being connected to a particular machine tool in the plant. As described in further detail below, each indicator set has a printed circuit receptacle 16 adapted to receive a printed circuit corresponding to a code number, which may refer to the part being produced on the machine. Each set further has a printed circuit receptacle 17 for the operator's number. A productive time register 18, an idle time register 19, and a parts counter 21 are provided in each set. The purpose and function of these registers is described in detail in the aforementioned application, but in general each of these registers is of a conventional drum or wheeled type having a plurality of digits which are solenoid or otherwise operated in accordance with appropriate impulses. These three registers are resettable by shaft rotation, and a counter reset motor 22 is provided in each indicator set, energization of this motor causing resetting of the registers. As will be described below, resetting of each wheel in a register will cause electrical impulses to be produced which are equal to the difference between the setting of the wheel and ten, these impulses being transmitted to the intermediate storage unit. A precoded machine number is carried by a switch 23 which may be in the form of a plurality of wafer switches on a common axis, the contact arms of these switches being rotated by motor 22 during the counter resetting operation, the impulses produced by switch 23 being stored in additional intermediate storage units.

In the embodiment of FIGURES 1–4, a push button 24 is provided for each starting motor 22, this push button also serving to energize an arming relay 25 which connects all the information units described above to their respective intermediate storage units. In the case of the productive time register, idle time register, parts counter and machine number switch, these intermediate storage units comprise step switches as shown in FIGURE 1, each stepping switch corresponding to a single digit. In the case of the code number and operator's number printed circuits, a group of relays, termed digit relays, are provided for each digit, these relays being so arranged that they may be energized in various combinations corresponding to the digits zero to nine.

Figure 2:
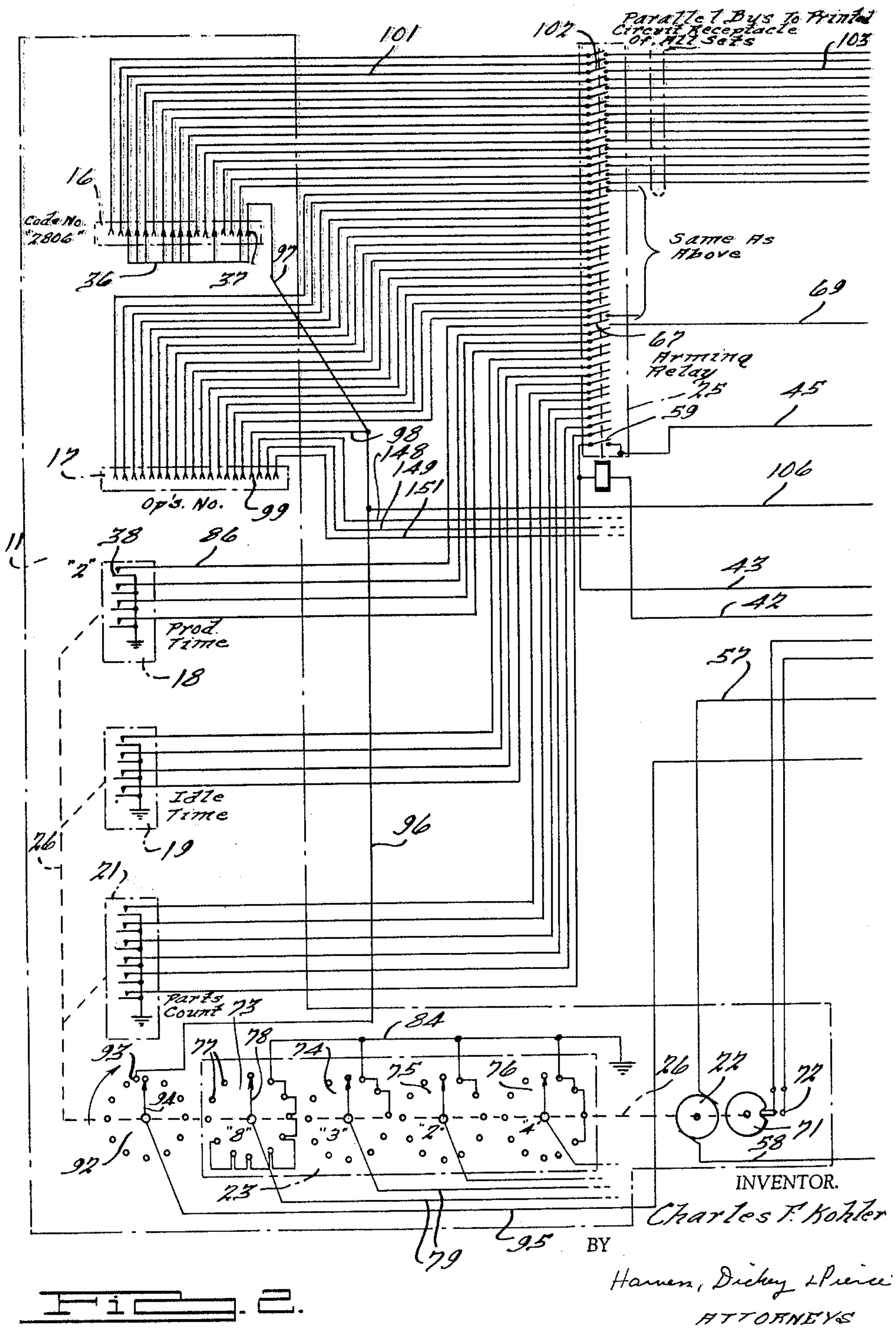
FIGURE 2 is a portion of an electrical circuit diagram showing the system of FIGURE 1.
Figure 3:
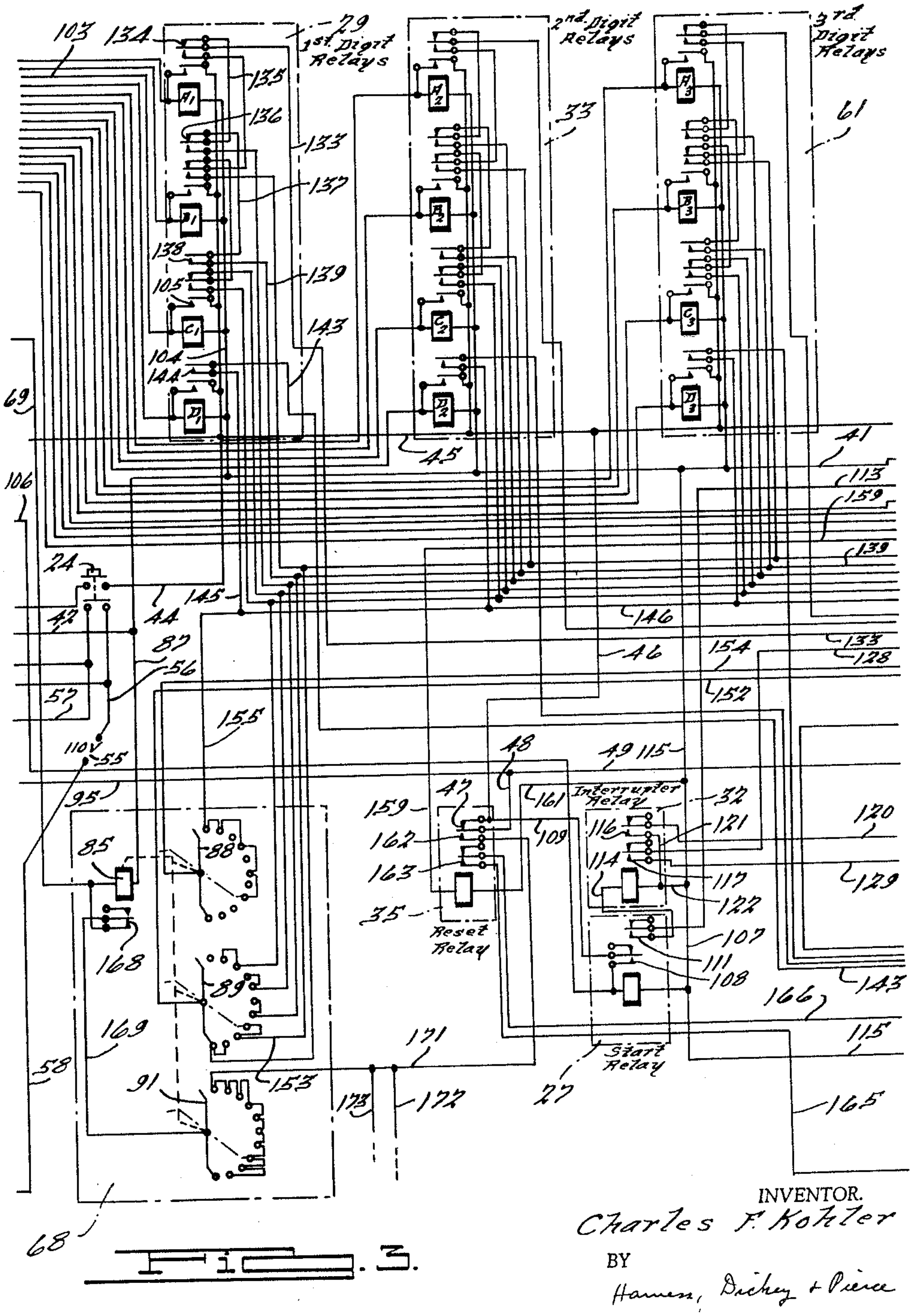
FIGURE 3 is another portion of the electrical circuit diagram.
Figure 4:
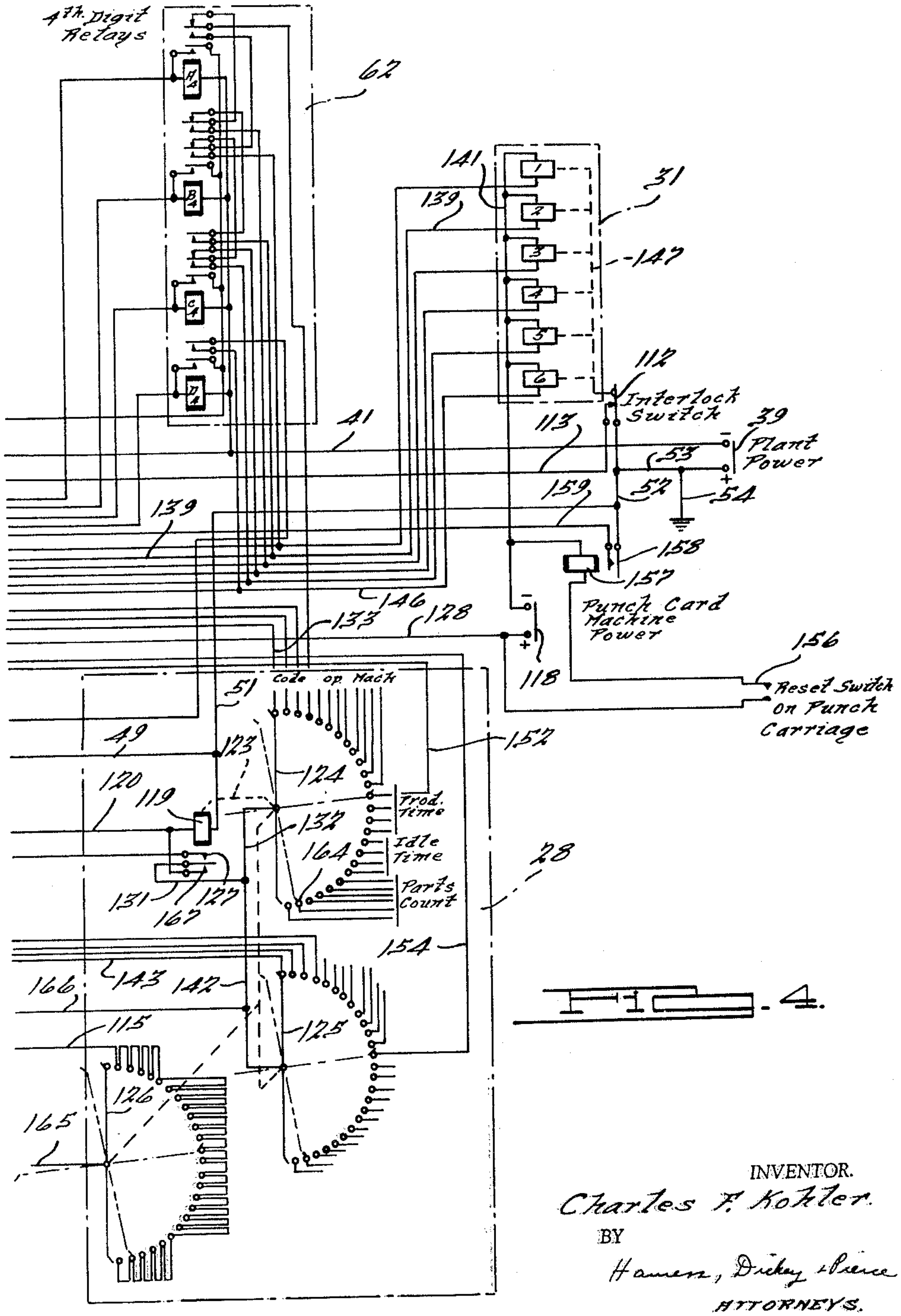
FIGURE 4 is a third portion of the diagram, FIGURES 2, 3 and 4 being placed successively to the right for purposes of examination.

As the counter reset shaft, indicated at 26, approaches its original position, a start relay 27 is energized, this start relay causing actuation of a scanning unit 28. The scanning unit will be connected in turn with each intermediate storage unit. As it is connected with the first such storage unit, indicated at 29, it will transmit information from this unit to a recording unit 31. In the illustrated embodiment, as shown in FIGURES 2, 3 and 4, storage unit 29 comprises a group of four relays called the first digit relays of the code number. Certain of these relays will be energized, depending upon the first digit of the code number as carried by the printed circuit inserted in receptacle 16. This combination of energized relays will in turn cause certain punch card solenoids in recording unit 31 to be energized, setting the punches in the first row of the unit. In the case of a Remington Rand punch card unit, six punch card solenoids will be provided, and a carriage having twenty-six rows of six punches each will be adjacent these solenoids. The solenoids and carriage will move relative to each other so that the solenoids may set specific punches in each row.

An interrupter relay 32 is provided, this relay being responsive to the setting of punches in the first row to cause scanning unit 28 to be connected to the second storage unit indicated at 33. As a feature of the invention, the connections among recording unit 31, interrupter relay 32, and scanning unit 28 are such that the power for recording unit 31 will not be interconnected with the power supply for the remainder of the recording device. Storage unit 33 comprises another group of four relays, called the second digit relays of the code number. The information in these relays will likewise be transmitted to the recording unit, and this cycle will be continued until the digit relays of the code number and clock number have all been connected to the recording unit.

The scanning unit will next be connected to the first digit stepping switch 34 of the machine number. As described above, this stepping switch will have been previously set in a predetermined position depending upon the number of impulses received by the first digit wafer in switch 23. As the scanning unit connects stepping switch 34 to recording unit 31, one or more punch card solenoids in unit 31 will be energized in accordance with the position of stepping switch 34. This will in turn again energize interrupter relay 32 which will cause scanning unit 28 to continue its progress along the remaining intermediate storage units.

After scanning unit 28 has connected the sixth digit stepping switch of the parts counter to recording unit 31, all the punches which have been preset by the punch card solenoids will simultaneously punch holes in the card. In response to this action, an arming, storage and scanning reset relay 35 will be energized. Energization of this relay will cause arming relay 25 to be deenergized, disconnecting the registers, printed circuit receptacles and wafer switches of indicator set 11 from their respective intermediate storage units. At the same time, energization of relay 35 will cause the intermediate storage units to be returned to their blank or zero position. In the case of the digit relays, this will be accomplished by causing deenergization of all relays. In the case of the stepping switches, these will be stepped around to their zero or initial position. At the same time, energization of reset relay 35 will cause scanning unit 28, which likewise comprises a stepping switch, to be returned to its zero position. After this has been accomplished, a push button 24 in another indicator set, such as set 12, may be actuated to start another cycle.

Referring now to FIGURES 2, 3 and 4, these figures show in detail the electrical connections between indicator set 11 and the recording system. The various elements of the system are shown in their initial condition before push button 24 is closed. Since the basic components of the system and their relation with each other have been described above, an understanding of the electrical diagram can perhaps best be obtained from a description of the operation after push button 24 has been depressed.

We will assume for purposes of the description that the following table represents the punch card solenoid code and the digit relay code for the digits from zero to nine:

| Digit | Punch Card Solenoid Code | Digit Relay Code |
|---|---|---|
| 0 | 1 | A—B |
| 1 | 2 | C |
| 2 | 2—6 | C—D |
| 3 | 3 | B |
| 4 | 3—6 | B—D |
| 5 | 4 | A |
| 6 | 4—6 | A—D |
| 7 | 5 | A—C |
| 8 | 5—6 | A—C—D |
| 9 | 6 | D |

In other words, in order to record the digit zero, punch card solenoid 1 would be energized; in order to record the digit 2, punch card solenoids 2 and 6 would be energized. Likewise, in order to energize punch card solenoid 1 (that is, to record the digit zero), relays A and B of any set of digit relays would be energized, so that when scanning unit 28 connects this set of digit relays with the punch card machine, the proper solenoids will be energized.

We will further assume that code number "2806" is applied to indicator set 11, so that a printed circuit marked 36 will be inserted in receptacle 16. Terminal 37 of receptacle 16 is a common ground as will be described below. We may also assume that the first digit of production time register 18 is the digit "2." This digit is on a wheel (not shown) adjacent a switch 38 so that when the wheel is reset to zero it will close switch 38 eight times.

When push button 24 is depressed, it will close a circuit to arming relay 25, this circuit being traced as follows: From the minus side of plant power supply 39, indicated in FIGURE 4, through wires 41 and 42, relay 25, wire 43, switch 24, wires 44, 45 and 46, switch 47 of reset relay 35, and wires 48, 49, 51, 52 and 53 to the plus side of plant power supply 39 which is connected to ground by wire 54. Closure of switch 24 will also energize counter reset motor 22 through the following circuit: From one side of power source 55, indicated in FIGURE 3, through wire 56, switch 24, wire 57, motor 22 and wire 58 to the other side of power source 55.

Energization of arming relay 25 will cause a holding circuit for this relay to be closed through switch 59 to wire 45. The arming relay will also close the circuits leading from receptacles 16 and 17 and registers 18, 19 and 21 to their respective intermediate storage units. More particularly, first digit relays 29, second digit relays 33, third digit relays 61 and fourth digit relays 62 will be connected to code receptacle 16. Similarly, digit relay sets 63, 64, 65 and 66 will be connected to operator's receptacle 17, these digit relays being indicated schematically in FIGURE 1 but not being shown in FIGURES 2, 3 or 4. A switch 67 will be closed by the arming relay to connect first digit switch 38 of productive time register 18 to first digit stepping switch 68 for the productive time register, this connection being through wire 69. Similar switches will connect the other digit switches of registers 18, 19 and 21 to additional stepping switches not shown in FIGURES 2, 3 and 4.

Energization of motor 22 will cause rotation of counter reset shaft 26. A cam 71 on this shaft will immediately cause closure of a switch 72 by-passing push button 24 so that motor 22 will continue its rotation. Mounted on shaft 26 are a plurality of wafer switches 73, 74, 75 and 76 which constitute machine number switch 23. Each of these wafer switches has a plurality of contacts 77 and a rotating arm 78 which engages these contacts in succession. Each arm is connected by a wire 79 to an individual digit stepping switch similar to that illustrated at 68, these stepping switches not being shown in FIGURES 2, 3 and 4 but being indicated at 34, 81, 82 and 83 in FIGURE 1. Assuming, for example, that the machine number is "8324," eight contacts 77 of wafer 73 will be connected to ground by a wire 84, and three contacts of wafer 74, two contacts of wafer 75 and four contacts of wafer 76 will be similarly connected to ground. In this way, rotation of shaft 26 will cause the digits "8324" to be stored in stepping switches 34, 81, 82 and 83, in a manner similar to that described below with respect to stepping switch 68.

As shaft 26 rotates, it will cause rotation of the digit wheels associated with registers 18, 19 and 21 toward their zero position. Since the wheel associated with switch 38 read "2," this switch will be closed eight times during the resetting operation. This will cause eight successive energizations of relay 85 in stepping switch 68 through the following circuit: From ground through switch 38, wire 86, switch 67, wire 69, relay 85 and wires 87 and 41 to the minus side of plant power. This will cause movement of stepping contacts 88, 89 and 91 to their dot-dash line position as shown in FIGURE 3.

Also mounted on shaft 26 is a wafer switch 92, this switch having a contact 93 engageable by an arm 94 just before this arm returns to its zero position. Arm 94 is connected to the ground or plus side of plant power source 39 by wires 95, 49, 51, 52 and 53. Contact 93 is connected by wires 96, 97 and 98 to common terminal 37 of receptacle 16 and common terminal 99 of receptacle 17. This will cause immediate energization of those digit relays in sets 29, 33 and 61 to 66 which are connected to the power supply by the printed circuits inserted in receptacles 16 and 17. For example, since the first digit of the code number printed circuti inserted in receptacle 16 is the digit "2," relays $C_1$ and $D_1$ of first digit relays 29 will be energized. The circuit for relay $C_1$ may be traced as follows: From wire 97 through printed circuit 36, wire 101, switch 102, wire 103, relay $C_1$ of digit relay 29, and wires 104 and 41 to the minus side of plant power. A holding switch 105 will be closed by relay $C_1$ to maintain the relay in its energized condition after arm 94 of wafer 92 has left contact 93. The other energized digit relays will likewise remain in their energized condition.

Engagement of contact 93 by arm 94 of wafer 92 will also cause energization of start relay 27 through the following circuit: Wires 96 and 106, start relay 27 and wires 107 and 41. This will cause closure of a holding switch 108 for start relay 27 in a circuit which includes wires 53, 52, 51, 49 and 48, switch 47, wire 109, switch 108, relay 27 and wires 107 and 41. Energization of start relay 27 will close switch 111 which in turn will energize interrupter relay 32 through the following circuit: Wire 53, interlock switch 112 adjacent the punch card machine (the purpose of which will be later described), wire 113, switch 111, wire 114, relay 32 and wires 115 and 41.

Energization of interrupter relay 32 will close switches 116 and 117. Switch 116 controls scanning unit 28 whereas switch 117 serves to connect the punch card machine power supply 118 to the punch card relays. More particularly, closure of switch 116 will complete a circuit through solenoid 119 of scanning unit 28 through the following circuit: Wires 53, 52 and 51, solenoid 119, wire 120 switch 116 and wires 121, 122, 115 and 41. The connection 123 between solenoid 119 and arms 124, 125 and 126 of scanning unit 28 is such that these arms will be moved upon deenergization of the solenoid but will remain in position when the solenoid is energized.

Energization of solenoid 119 will close switch 127. This will cause energization of the punch card solenoids corresponding to the information stored in first digit relays 29, namely punch card solenoids 2 and 6. This will be accomplished through the following circuits:

*Punch card solenoid 2.*—From the positive side of punch card machine power supply 118 through wire 128, switch 117, wire 129, switch 127, wires 131 and 132, arm 124, wire 133, switch 134, wire 135, switch 136, wire 137, switch 138, wire 139, punch card solenoid 2 and wire 141 to the minus side of punch card machine power.

*Punch card solenoid 6.*—The same as above up to wire 131, then through wire 142, stepping switch arm 125, wire 143, switch 144, wires 145 and 146, punch card solenoid 6 and wire 141 to the minus side of punch card machine power. It will be noted that stepping switch arm 125 serves to connect punch card solenoid 6 in the circuit when so required by the information stored in the digit relays.

When the armatures of punch card solenoids 2 and 6 reach their fully actuated position, they will cause corresponding punches to be set in the first row of punches carried in the machine. When the punch card solenoid armatures have reached their fully actuated position, but not before, switch 112 will be opened. This switch, which may be termed an interlock switch, is connected by mechanical means indicated schematically at 147 to the punch card solenoids in such a manner that the switch will be opened in response to arrival of the energized solenoid armatures to their fully actuated position. The function of interlock switch 112 is thus to assure that the punches will be completely set before energization of the solenoids will cease. Although incorporated in the punch card machine, switch 112 is not a conventional part of such machine but is one of the features of the present invention.

Opening of switch 112 will deenergize interrupter relay 32, thus opening switches 116 and 117. Opening of switch 116 will cause deenergization of solenoid 119 of scanning unit 28, thus causing movement of stepping arms 124, 125 and 126 to the next contact. Opening of switch 117 will open the circuits to the punch card machine solenoids, thus permitting retraction of the armatures of solenoids 2 and 6 and closing of switch 112. It will be noted that because the punch card machine power circuit is opened by means of interlock switch 112 which in turn causes opening of switch 117, this will result in a short time delay, thus assuring that the punches will reach their home position. Moreover, by operating through interrupter relay 32 the possibility of an interconnection between plant power and punch card machine power will be eliminated.

Movement of the stepping switch arms in scanning unit 28 to their next position will enable reading of the second digit in the code number. This will take place by virtue of the reenergization of interrupter relay 52, which in turn will be caused by reclosure of interlock switch 112. It is not believed necessary to describe in detail the manner in which punch card solenoids 5 and 6 will be energized to record the digit "8" of the code number "2806," but it will be obvious that this will be caused by the previous energization of digit relays $A_2$, $C_2$ and $D_2$ in digit relay set 33.

The operation will continue until the four digits of the code number and the four digits of the operator's number have been read, that is, until the punches corresponding to these eight digits have been set in the punch card machine. It may be mentioned at this point that three wires 148, 149 and 151 are connected to terminals in operator's number receptacle 17 and are intended to be connected to externally controlled circuits for other portions of the indicator set which are not pertinent to this discussion, these connections being illustrated merely for purposes of completeness of the drawing.

After reading of the code and operator's numbers have been completed, scanning unit 28 will be advanced to read the four machine number digits. As described previously, wafer switches 73–76 will have caused stepping switches 34, 81, 82 and 83 to store information corresponding to the numeral "8324." These stepping switches will now be connected in succession to the punch card solenoids so that corresponding punches will be set in machine 31. Since stepping switches 34, 81, 82 and 83 are not shown in detail in the drawings, the circuits through which these punch card machine actuations will be accomplished may be illustrated with respect to stepping switch 68, which is shown in detail in FIGURE 3 and constitutes the first digit stepping switch of the productive time register.

As mentioned previously, we will assume that the first digit of the productive time register was "2" so that when the register was reset, the arms of stepping switch 68 will be rotated to their dot-dash line position as shown in FIGURE 3. Assuming that arms 124, 125 and 126 of scanning unit 28 are in their dot-dash line position as shown in FIGURE 4, the circuits to punch card solenoids 2 and 6, representing the digit "2" may be traced as follows:

*Punch card solenoid 2.*—From the positive side of punch card machine power, through wire 128, switch 117, wire 129, switch 127, wire 131, arm 124, wire 152, arm 89, wire 153, wire 139, punch card solenoid 2 and wire 141 to the minus side of punch card machine power.

*Punch card solenoid 6.*—The same as above up to wire 131, then through wire 142, arm 125, wire 154, arm 88, wires 155 and 146, punch card solenoid 6 and wire 141 to the minus side of punch card machine power.

Punches for the remaining digits of the productive time register and the digits of the idle time register and parts counter will be set in a similar manner. After the punches for the sixth parts counter digit have been set, all the punches will simultaneously punch the card, at the same time causing a switch 156 in the punch card machine to be closed. Through a relay 157, this will cause closure of a switch 158 which is in the circuit of reset relay 35. This circuit may be traced as follows: From the positive side of plant power through wires 53, 52 and 159, reset relay 35, and wires 161, 115 and 41 to the negative side of plant power. Energization of reset relay 35 will cause opening of switch 47, thus deenergizing all the previously energized digit relays and also deenergizing start relay 27. This in turn will cause deenergization of interrupter relay 32, so that solenoid 119 of scanning unit 28 will be deenergized with the scanning unit arms in the position shown in solid lines in FIGURE 4.

Energization of reset relay 35 will also cause closure of switches 162 and 163. Closure of switch 162 serves to cause resetting of digit stepping switch 68 as well as all the other digit stepping switches to their original position as shown in solid lines in FIGURE 3. For digit stepping switch 68, this circuit may be traced as follows: From the negative side of plant power through wires 41 and 87, solenoid 85, switch 168, wire 169, arm 91 of stepping switch 68, wire 171, switch 162, and wires 48, 49, 51, 52 and 53 to the positive side of plant power. Each energization of solenoid 85 will cause opening of switch 168, so that the stepping switch will keep rotating until the open position of arm 91 is reached. Wires 172 and 173 are partially shown to indicate connections to other digit stepping switches which will be similarly reset. As the punch card machine returns to its normal position in readiness for another cycle, switch 158 will be opened to deenergize reset relay 35.

The function of switch 163 is to cause resetting of scanning unit 28 to the position shown in solid lines in FIGURE 4, in cases where this position has not been reached already as in the present case. For example, if the parts counter had only had four digits, the final position of scanning unit 28 would have been with arm 124 engaging contact 164. In this case, solenoid 119 would have been repeatedly energized through the following circuit until the solid line position of scanning unit 28 were reached: From the negative side of plant power through wires 41, 115, arm 126 of scanning unit 28 which is in the double dot-dash line position of FIGURE 4, wire 165, switch 163, wires 166, 142 and 131, switch 167, solenoid 119, and wires 51, 52 and 53 to the plus side of plant power. Each energization of solenoid 119 would open switch 167, causing deenergization of the solenoid, and this pulsing would continue until arm 126 reached the open position shown in solid lines.

FIGURE 5 shows an arrangement for automatically scanning a number of indicator sets without the necessity of pressing a push button in order to record the information in each set. Such an arrangement is useful in industrial establishments having a large number of machines each of which has a corresponding indicator set. During any particular shift, many of these machines may be idle, and the system shown in FIGURE 5 is adapted automatically to scan all the indicator sets at the end of each shift, or at any other time interval, and record the information from all indicator sets for machines to which an operator has been assigned.

The system of FIGURE 5 is adapted for use in conjunction with the arrangement shown in FIGURES 2, 3 and 4. In general terms, the automatic scanner includes a stepping switch which is started periodically by a clock switch and is connected successively with the operator's number receptacles of the various indicator sets. When the stepping switch encounters a receptacle in which an operator's number printed circuit has been inserted, the stepping switch will stop and will cause actuation of a relay arrangement which is in effect a substitute for push button 24 in FIGURE 3. After the indicator set information has been recorded, the stepping switch will continue its rotation until the next operator's number printed circuit is encountered.

Referring more specifically to FIGURE 5, a plurality of operator's number receptacles 201, 202, and 203 are shown, each of these receptacles corresponding to an indicator set for a machine in an industrial establishment. For the purpose of the automatic scanning device, two terminals 204 and 205 are provided in each printed circuit receptacle in addition to the terminals shown in FIGURE 2 for operator's number receptacle 17. These terminals are adapted to receive a conductor 206 provided on the printed circuit card for each operator. Terminal 205 is adapted to be connected to line 45 shown in FIGURES 2, 3 and 4 by a wire 207, wire 45 being connected to the positive side of plant power whenever reset relay 35 is deenergized. Each terminal 204 is connected by a wire 208 to a terminal 209 on level A of a stepping switch 211.

Stepping switch 211 is driven by a motor magnet 212 in such fashion that when the motor magnet is energized, the stepping switch will be cocked, and when the motor magnet is deenergized the stepping switch will move to its next position. Stepping switch 211 also has a level B with contacts 213, each of these contacts being connected to a relay 214 which is provided for each indicator set. Relay 214 when energized will start a recording cycle for its corresponding indicator set in a manner later described.

The operation of stepping switch 211 is initiated periodically by a clock switch 215. This switch may be set, for example, to initiate action of stepping switch 211 at the end of each shift in the factory. A cam 216 is provided in stepping switch 211, the cam being so constructed that once stepping switch 211 is started, it will continue its movement until its original position is reached.

The remaining portions of the system shown in FIGURE 5 may perhaps best be described by an operational description of the arrangement. Assuming an initial condition in which switch 211 is in the position shown in FIGURE 5, closure of clock switch 215 will momentarily energize motor magnet 212 through the following circuit: From the positive side of plant power through wire 217, clock switch 215, wire 218, contact 219, switch 221, motor magnet 212, contact 222 of an interrupter switch 223, wire 224, switch 225 of a normally deenergized operating relay 226, wire 227, upper contact 228 of a switch 229 operated by a normally deenergized advancing relay 231, and wire 232 to the negative side of plant power.

Energization of motor magnet 212 will lift switch 223, momentarily opening the circuit to the motor magnet which, when deenergized, will advance switch arm 233 to the first contact 209 and switch arm 234 to the first contact 213. This movement will also rotate cam 216 so that switch 221 will remain in its lower position in engagement with lower contact 235, thus by-passing clock switch 215 through wire 236.

Assuming that no printed circuit is inserted in receptacle 201, motor magnet 212 will again become energized by virtue of engagement of switch 223 with contact 222. Further assuming that receptacle 202 has an operator's number circuit inserted therein, arrival of arm 233 at the second contact 209 (upon the second deenergization of motor magnet 212) will cause a circuit to be closed through operating relay 226 by means of the following circuit: From wire 45 through printed circuit 206 through wire 208, arm 233, operating relay 226, and wire 237 to the negative side of plant power. Energization of relay 226 will cause opening of switch 225 and closing of switch 238. Opening of switch 225 will cause motor magnet 212 to remain in its denergized condition. Closing of switch 238 will cause energization of a slow acting relay 239, the circuit being traced from the negative side of plant power through wire 237, switch 238, wire 241, relay 239 and wires 242, 243 and 244 to the positive side of plant power. A circuit will also be completed through fast acting relay 245 through a switch 246 which is opened after a predetermined time interval by slow acting relay 239. Relay 245 will close a switch 247 which in turn will close a circuit through relay 214 and arm 234 of stepping switch 211.

A relay 214 is provided for each indicator set, and energization of this relay will close switches 248 and 249. Switch 248 is adapted to be connected across the upper set of contacts of push button 24 in FIGURE 3, while switch 249 is adapted to be connected across the lower set of contacts of this push button. It will thus be seen that energization of relay 214 will cause a complete read-out cycle of the indicator set corresponding to operator's card receptacle 202. After this cycle has been started, slow acting relay 239 will open switch 246, deenergizing relay 245. This in turn will cause opening of switch 247 which will deenergize relay 214, opening switches 248 and 249.

After the read-out operation has been completed, relay 231 will be energized, this relay being connected across punch carriage switch 156 shown in FIGURE 4. Energization of relay 231 will cause switch arm 229 to engage lower contact 251, and will cause switch 252 to close. Engagement of switch arm 229 with contact 251 will cause energization of motor magnet 212 through a circuit leading from the negative side of plant power through a wire 232, switch arm 229, contact 251, wire 253, contact 222, motor magnet 212, contact 235 and wire 236 to the positive side of plant power. Motor magnet 212 will stay in its energized position by virtue of the fact that closure of switch 252 and engagement of switch arm 223 with upper contact 254 will maintain the circuit through the motor magnet, contact 254 being connected to switch 252 by wire 255. Arms 233 and 234 will not move during this energization of motor magnet 212. The reason for holding motor magnet 212 in its energized condition until relay 231 is deenergized, is to prevent possible skipping of one or more indicator sets which might occur if motor magnet 212 were deenergized before relay 231.

Deenergization of relay 231 will cause opening of switch 252 and engagement of switch arm 229 with contact 228. Opening of switch 252 will cause deenergization of motor magnet 212, causing arms 233 and 234 to advance one step. As arm 233 moves from one contact to the next, relay 226 will become deenergized, closing switch 225 and opening switch 238. Opening of switch 238 will deenergize relay 239. Closure of switch 225 will complete a circuit through motor magnet 212, assuming that the next contact engaged by arm 233 does not again reenergize relay 226, thus opening switch 225. In the arrangement shown in FIGURE 5, the next contact engaged by arm 233 (that corresponding to printed circuit receptacle 203) will cause energization of relay 226, and motor magnet 212 will thus remain deenergized. Another recording cycle will thus be initiated. This process will continue until stepping switch 211 has completed its rotation, at which time cam 216 will cause engagement of switch arm 221 with contact 219 and disengagement from contact 235. Motor magnet 212 will thus remain deenergized until clock switch 215 again starts the cycle.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claim.

What is claimed is:

In combination, a plurality of indicator sets capable of accumulating data, a recording system connectable to each indicator set for recording the data accumulated therein, manually operable means at each indicator set movable to a recording position when said indicator set is to have data to be recorded, recorder connecting means associated with each indicator set, a stepping switch having a first set of contacts connected to said manually operable means and a second set of contacts connected to said recorder connecting means, operating means connected between said first and second sets of contacts, said operating means being responsive to the arrival of said stepping switch at an indicator set having accumulated data to cause said stepping switch to halt and the corresponding recorder connecting means to move to its connecting position, means responsive to the completion of data recording for said indicator set to cause said stepping switch to advance, said manually operable means comprising a printed circuit receptacle, means in said recording system for recording data relating to an operator assigned to a machine with which the indicator set is associated, means connecting said receptacle to said last-mentioned means and to said first set of stepping switch contacts, and a printed circuit for insertion in said receptacle.

References Cited in the file of this patent

UNITED STATES PATENTS

| | | |
|---|---|---|
| 2,125,345 | Hunt | Aug. 2, 1938 |
| 2,126,025 | Muehter | Aug. 9, 1938 |
| 2,425,080 | Blakeslee | Aug. 5, 1947 |
| 2,427,355 | Keinath | Sept. 16, 1947 |
| 2,564,294 | Belcher | Aug. 14, 1951 |
| 2,625,458 | Ruhland | Jan. 13, 1953 |
| 2,712,128 | Woodruff | June 28, 1955 |
| 2,883,255 | Anderson | Apr. 21, 1959 |
| 2,918,654 | Hillyer | Dec. 22, 1959 |
| 2,953,777 | Gridley | Sept. 20, 1960 |